(12) United States Patent
Erickson et al.

(10) Patent No.: US 8,727,060 B1
(45) Date of Patent: May 20, 2014

(54) PYROTECHNIC WINDOW BREAKER

(71) Applicant: Autoliv ASP, Inc., Ogden, UT (US)

(72) Inventors: Chris Erickson, Willard, UT (US); Bradley W. Smith, Plain City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/744,838

(22) Filed: Jan. 18, 2013

(51) Int. Cl.
  *B60R 21/00* (2006.01)
(52) U.S. Cl.
  USPC .......................................... 180/271; 30/367
(58) Field of Classification Search
  USPC ............ 30/358, 361, 366, 367; 102/530, 531; 180/271, 274, 282; 280/737, 741
  See application file for complete search history.

(56) References Cited

U.S. PATENT DOCUMENTS

| | | | | |
|---|---|---|---|---|
| 3,353,445 A | * | 11/1967 | Temple et al. .................. | 89/1.14 |
| 3,741,583 A | * | 6/1973 | Usui et al. ...................... | 280/735 |
| 5,318,145 A | * | 6/1994 | Vollmer ......................... | 180/274 |
| 5,350,192 A | * | 9/1994 | Blumenthal .................. | 280/737 |
| 5,653,463 A | * | 8/1997 | Jeong ............................. | 280/737 |
| 5,657,543 A | * | 8/1997 | Collins .......................... | 30/367 |
| 6,418,628 B1 | * | 7/2002 | Steingass ........................ | 30/367 |
| 7,063,019 B2 | * | 6/2006 | Parks et al. ................. | 102/202.9 |
| 7,740,273 B2 | | 6/2010 | Breed | |
| 7,938,444 B2 | | 5/2011 | Williams et al. | |
| 2003/0089755 A1 | * | 5/2003 | Peers-Smith et al. ......... | 225/103 |

FOREIGN PATENT DOCUMENTS

GB        2375789 A     * 11/2002    ................ E06B 3/66

* cited by examiner

*Primary Examiner* — Faye M Fleming
*Assistant Examiner* — Laura Freedman
(74) *Attorney, Agent, or Firm* — Harness, Dickey & Pierce, P.L.C.

(57) ABSTRACT

A window breaker is provided that may include a housing, a pyrotechnic device and a piston. The housing may include a slot and a cavity having a first end and a second end. The slot may extend through a wall of the housing and into the cavity. The pyrotechnic device may be fixedly attached to the housing and at least partially disposed in the cavity. The piston may be disposed in the cavity between the pyrotechnic device and the first end. The piston may be movable away from the pyrotechnic device within the cavity from an undeployed position to a deployed position in response to actuation of the pyrotechnic device.

18 Claims, 3 Drawing Sheets

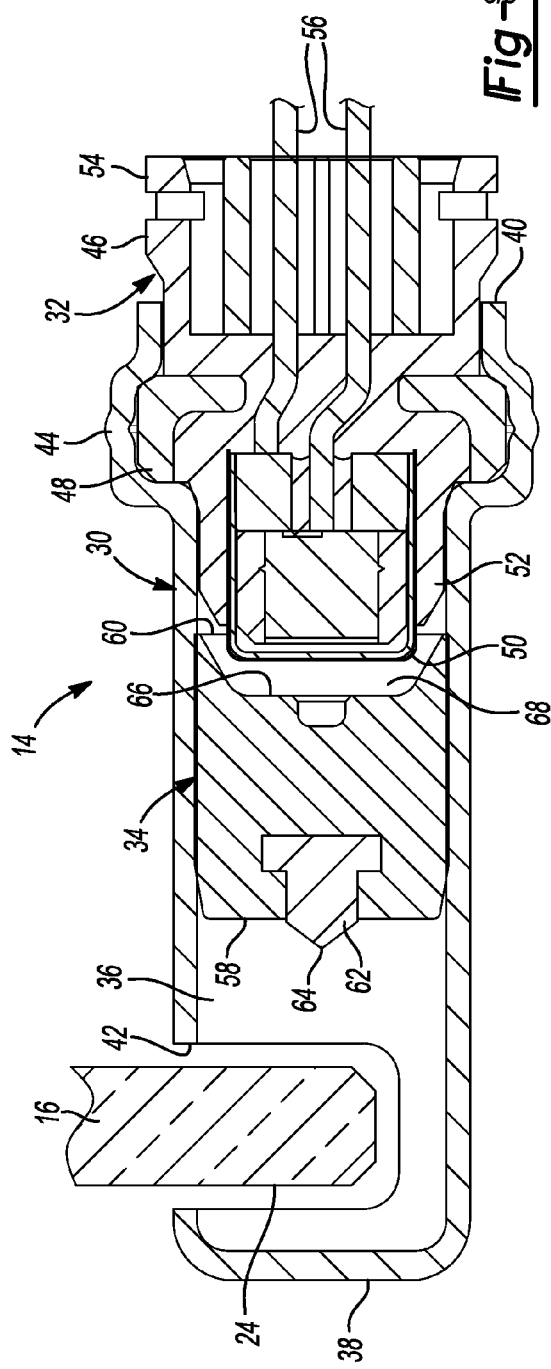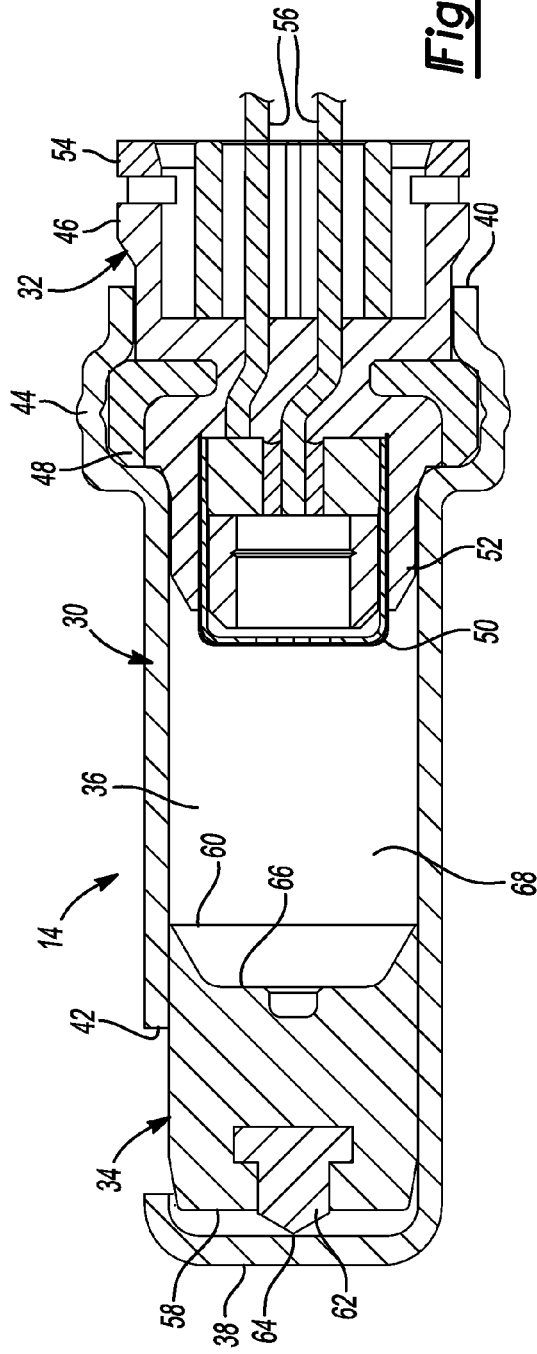

ent, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

PYROTECHNIC WINDOW BREAKER

FIELD

The present disclosure relates to a window breaker for a vehicle.

BACKGROUND

This section provides background information related to the present disclosure and is not necessarily prior art.

A vehicle impact event may render one or more of the occupant doors inoperable and thereby prevent normal occupant egress from the occupant cabin of the vehicle. In addition, modern vehicles conventionally include one or more airbags that inflate in response to an impact event to improve occupant safety. Inflation of airbags may introduce gaseous and/or particulate byproducts into the air in an occupant cabin of a vehicle. Accordingly, removal of one or more windows of the vehicle may facilitate egress from the occupant cabin and may reduce an occupant's exposure to airbag byproducts after an airbag deployment.

SUMMARY

This section provides a general summary of the disclosure, and is not a comprehensive disclosure of its full scope or all of its features.

In one form, the present disclosure provides a window breaker that may include a housing, a pyrotechnic device and a piston. The housing may include a slot and a cavity having a first end and a second end. The slot may extend through a wall of the housing and into the cavity. The pyrotechnic device may be fixedly attached to the housing and may be at least partially disposed in the cavity. The piston may be disposed in the cavity between the pyrotechnic device and the first end. The piston may be movable away from the pyrotechnic device within the cavity from an undeployed position to a deployed position in response to actuation of the pyrotechnic device.

In another form, the present disclosure provides a system that may include a window breaker and a controller. The window breaker may include a housing and a piston. The housing may include a slot and a cavity including a first end and a second end. The slot may extend through a wall of the housing and into the cavity. The piston may be disposed in the cavity between the first and second ends and may be movable within the cavity relative to the housing between an undeployed position and a deployed position. The controller may be electrically connected to the window breaker and may be operable to cause the piston to move from the undeployed position to the deployed position in response to a predetermined condition.

In another form, the present disclosure provides a vehicle that may include a door frame, a window pane, a window breaker and a controller. The window pane may be attached to the door frame for movement relative thereto. The window breaker may be attached to the door frame and may include a housing, a pyrotechnic device and a piston. The housing may have a slot and a cavity including a first end and a second end. The slot may extend through a wall of the housing and into the cavity. The slot may receive a portion of the window pane. The pyrotechnic device may be fixedly attached to the housing and may be at least partially disposed in the cavity. The piston may be disposed in the cavity between the pyrotechnic device and the first end. The piston may cooperate with the pyrotechnic device to form a combustion chamber therebetween such that a combustion event within the combustion chamber moves the piston within the cavity relative to the pyrotechnic device from an undeployed position to a deployed position. The controller may be electrically connected to the pyrotechnic device and may be operable to actuate the pyrotechnic device to cause the piston to move from the undeployed position to the deployed position to shatter the window frame in response to a predetermined vehicle condition.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a cross-sectional view of the window breaker engaging a window pane in an undeployed state; and FIG. 4 is a cross-sectional view of the window breaker in a deployed state.

Corresponding reference numerals indicate corresponding parts throughout the several views of the drawings.

DETAILED DESCRIPTION

Figure 1:
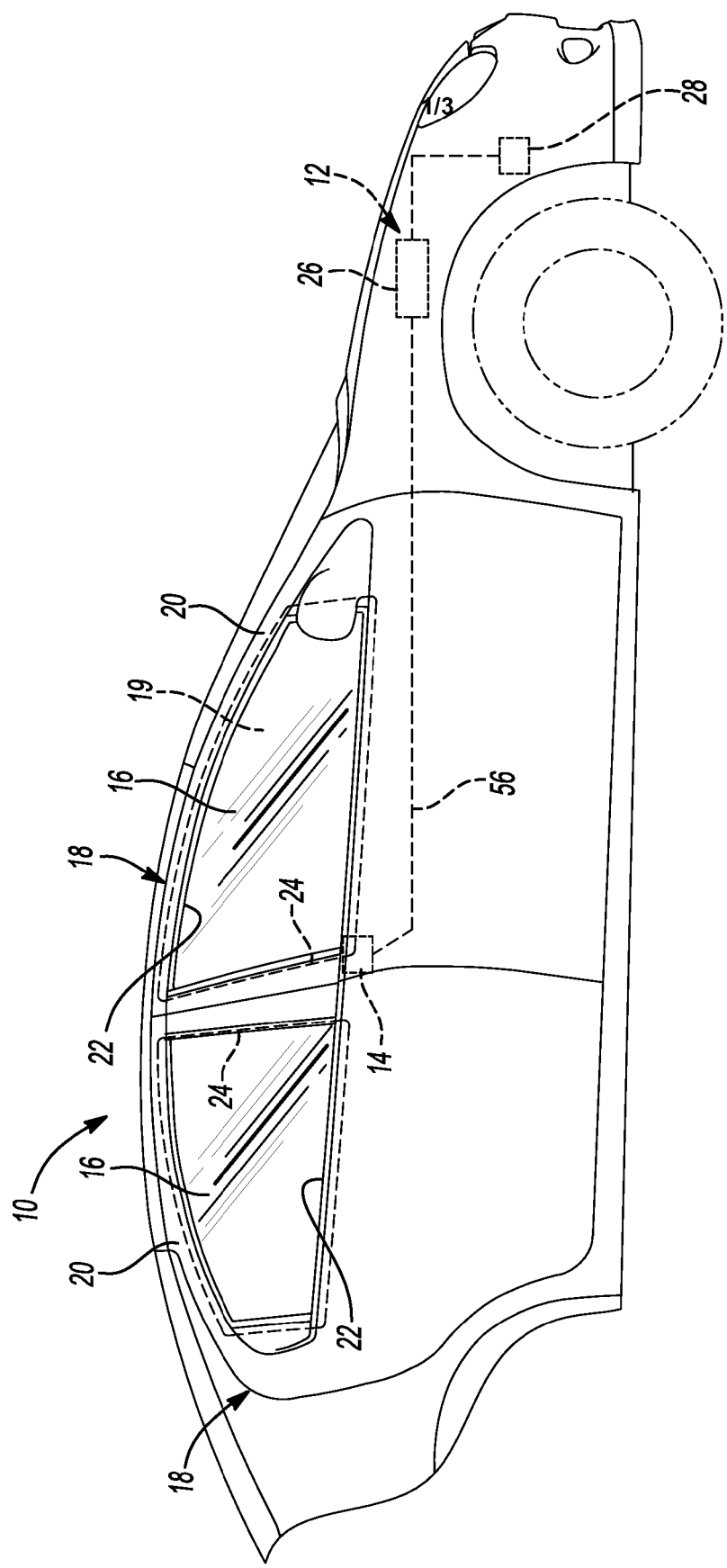
FIG. 1 is a partial side view of a vehicle having a window and a window breaker according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-4, a vehicle 10 is provided that includes a window-breaker system 12 having one or more window breakers 14 operable to break one or more window panes 16 of the vehicle 10. The window-breaker system 12 may actuate the one or more window breakers 14 in response to a predetermined event or condition, such as an impact event, an airbag deployment or a rollover event, for example, or any other event or condition associated with a crash or an emergency situation. Removal of one or more window panes 16 in response to such events or conditions may improve ventilation of airborne airbag byproducts from an occupant cabin 19 of the vehicle 10 and/or facilitate emergency egress of a vehicle occupant from the vehicle 10, for example.

As shown in FIG. 1, the vehicle 10 may include a plurality of door assemblies 18, each having a door frame 20 and a corresponding window pane 16 mounted to the door frame 20 for movement relative to a window opening 22 in the door frame 20 between open and closed positions. One or more of the door assemblies 18 may include at least one window breaker 14 mounted to the door frame 20. The window breaker 14 can be mounted at any suitable location within the door frame 20. For example, the window breaker 14 may be mounted adjacent the window opening 22 of the door frame 20 proximate an edge 24 of the window pane 16 so that the window breaker 14 can break the window pane 16 regardless of a position of the window pane 16 relative to the window opening 22 (i.e., regardless of whether the window pane 16 is in a closed position, an open position or a partially open position). While the embodiment illustrated in FIG. 1 depicts only a front door assembly 18 having the window breaker 14, in other embodiments, one or more rear door assemblies 18 may also include window breakers 14. It will be appreciated that driver's side and/or passenger's side door assemblies 18 could include window breakers 14.

Figure 2:
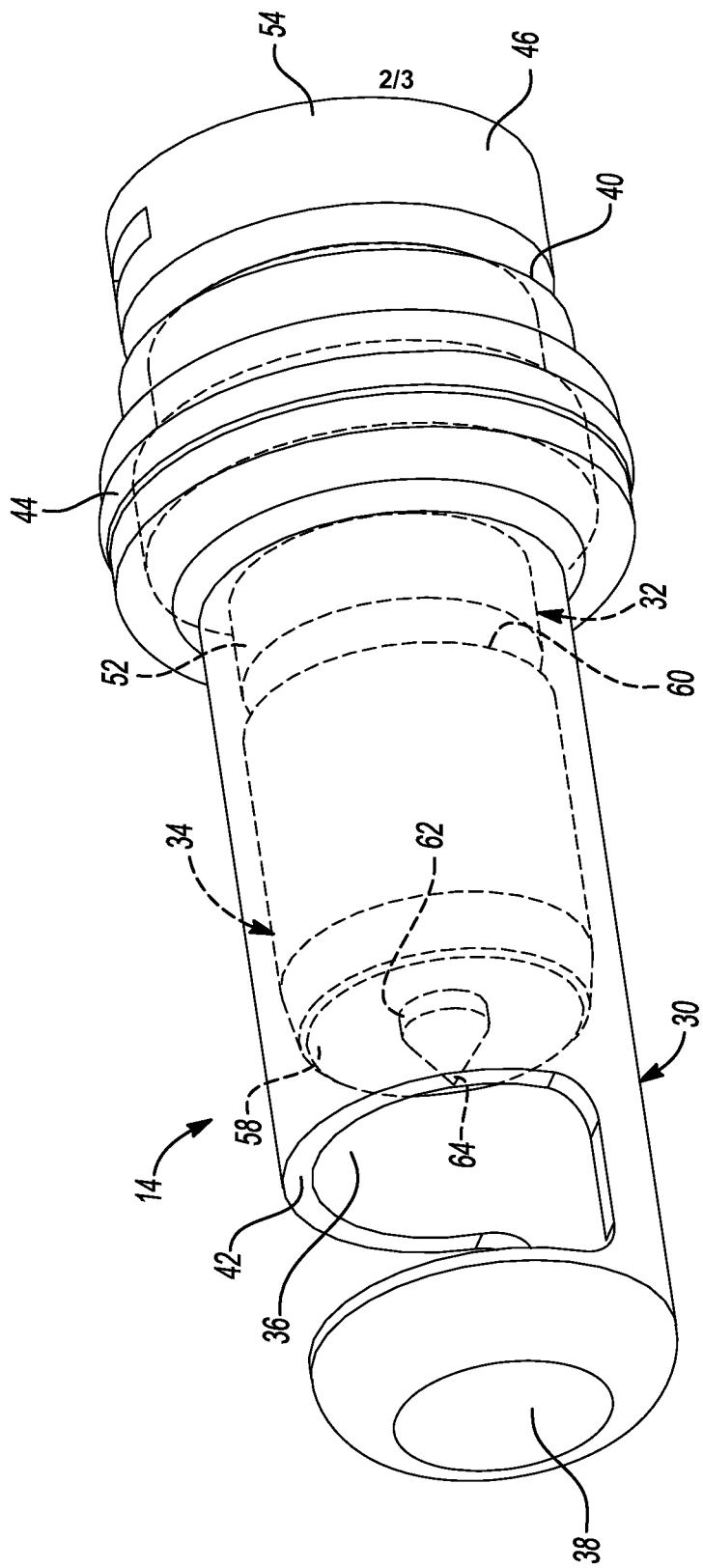
FIG. 2 is a perspective view of the window breaker of FIG. 1.

As shown in FIGS. 2-4, each window breaker 14 may include a housing 30, an actuator 32 and a piston 34. The housing 30 may be a generally tubular member defining a cavity 36 having a first end 38 and a second end 40 opposite the first end 38. In some embodiments, the first end 38 may be closed, and the second end may be open. A slot 42 may be formed in the housing 30. The slot 42 may be located proximate the first end 38. The slot 42 may extend into and communicate with the cavity 36. As shown in FIG. 3, the edge 24 of the window pane 16 may be received in the slot 42 such that edge 24 of the window pane 16 extends into the cavity 36. The housing 30 may also include a flared portion 44 proximate the second end 40 that fixedly engages the actuator 32.

The actuator 32 may include a molded plug 46, a bracket 48 and a pyrotechnic device 50. The plug 46 may include a first end 52 and a second end 54. The plug 46 may be partially received in the second end 40 of the housing 30 such that the first end 52 is disposed within the cavity 36 and the second end 54 protrudes out of the cavity 36. The bracket 48 may engage the plug 46 and the flared portion 44 of the housing 30 to securely fix the actuator 32 relative to the housing 30. The pyrotechnic device 50 may be fixedly received in the first end 52 such that the pyrotechnic device 50 extends into the cavity 36 of the housing 30. A plurality of wires 56 may be electrically connected to the pyrotechnic device 50 and may extend from the pyrotechnic device 50 through the second end 54 of the plug 46. The wires 56 may be electrically connected to the controller 26 (as shown in FIG. 1) and a battery (not shown) or other source of electrical power. The pyrotechnic device 50 may be operable to generate a pulse of pyrotechnic force in response to receiving electrical current. While the actuator 32 is described above as being a pyrotechnic actuator, in some embodiments, the actuator 32 could be any other type of actuator such as a spring-loaded actuator or a pneumatic actuator, for example.

The piston 34 may be a generally cylindrical body movably disposed within the cavity 36 of the housing 30 between the actuator 32 and the first end 38 of the housing 30. The piston 34 may include a first end 58 facing the first end 38 of the housing 30 and a second end 60 facing the actuator 32. The first end 58 of the piston 34 may include a protrusion 62 extending axially therefrom. The protrusion 62 may be a metallic or polymeric body, for example, and may include a pointed tip 64. The protrusion 62 can be a metallic nail, for example, and may be embedded in the piston 34. The second end 60 of the piston 34 may include a recess 66 (shown in FIGS. 3 and 4) that cooperates with the pyrotechnic device 50 to define a combustion chamber 68 therebetween.

In addition to one or more window breakers 14, the window-breaker system 12 may include a controller 26 and one or more sensors 28. The controller 26 is electrically connected to the one or more window breakers 14. The controller 26 may include or be part of an Application Specific Integrated Circuit (ASIC), an electronic circuit, a processor (shared, dedicated or group) and/or memory (shared, dedicated or group) that execute one or more software or firmware programs, a combinational logic circuit and/or other suitable components that provide the described functionality. The controller 26 may be a part of, or include a control module controlling one or more other vehicle systems. Alternatively, the controller 26 may be a control unit dedicated to the window-breaker system 12. While the controller 26 is shown in FIG. 1 as being located in a front end of the vehicle 10, the controller 26 could be located in any suitable location.

The one or more sensors 28 may be in wired or wireless communication with the controller 26 and could be located at any suitable location on or in the vehicle 10. The one or more sensors 28 may detect one or more operating conditions or parameters of the vehicle 10 and may transmit signals to the controller 26 indicating that one or more predetermined events or conditions have occurred. For example, the one or more sensors 28 may detect events or conditions such as the vehicle 10 being involved in a sufficiently severe impact event, the vehicle 10 being involved in a rollover event, deployment of one or more airbags, the vehicle 10 being submerged in a body of water, a fire in the occupant cabin 19, the presence of a predetermined concentration of noxious fumes (e.g., carbon monoxide) in the occupant cabin 19 and/or any other condition or event associated with a traffic accident or other emergency situation.

In response to the one or more sensors 28 detecting one or more predetermined event, the controller 26 may cause electrical current to be sent to the actuator 32. In some embodiments, the window-breaker system 12 could include a manual switch (not shown) disposed in the occupant cabin 19 that an occupant could manually actuate to send electrical current to the actuator 32 regardless of whether one of the predetermined events or conditions has been sensed. Upon receipt of the electrical current, the pyrotechnic device 50 may generate a combustion force that moves the piston 34 relative to the housing 30 and the actuator 32 from an undeployed position (shown in FIG. 3) to a deployed position (shown in FIG. 4).

While traveling toward the deployed position, the pointed tip 64 of the protrusion 62 of the piston 34 may impact the window pane 16 with sufficient force to rupture the window pane 16. The window pane 16, which may be formed from tempered glass, may shatter into small granular pieces upon being impacted by the protrusion 62, thereby removing the window pane 16 from the window opening 22. With the window pane 16 removed from the window opening 22, any fumes and/or airborne particulate matter can escape from the occupant cabin 19 to the surrounding atmosphere. Furthermore, occupants of the vehicle 10 could exit or be removed from the vehicle 10 through the window opening 22.

In some embodiments, the controller 26 may deploy the actuator 32 immediately upon receiving a signal from the sensor 28 indicating that one or more of the predetermined events or conditions have occurred. In some embodiments, the controller 26 may hesitate for a predetermined amount of time before deploying the actuator 32. For example, the controller 26 may send a signal to deploy the actuator 32 after a predetermined duration of between about two-hundred milliseconds and about five seconds has elapsed after the controller 26 receives a signal from the sensor 28 indicating that one or more of the predetermined events or conditions have occurred. It will be appreciated that the predetermined duration could be more or less than the exemplary range provided above.

It will be appreciated from the present disclosure that the closed first end 38 of the housing 30 may retain the piston 34 within the cavity 36 after deployment of the actuator 32. That is, the configuration of the housing 30 may prevent the piston 34 from disengaging the housing 30 and exiting the cavity 36.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A window breaker comprising:
   a housing including a slot and a cavity having a closed first end and a second end, the slot extending through a wall of the housing and extending into the cavity, the slot adapted to receive a portion of a vehicle window pane;
   a pyrotechnic device fixedly attached to the housing and at least partially disposed in the cavity; and
   a piston disposed in the cavity between the pyrotechnic device and the first end, the piston being movable away from the pyrotechnic device within the cavity from an undeployed position to a deployed position in response to actuation of the pyrotechnic device.

2. The window breaker of claim 1, wherein the piston includes first and second ends, the first end of the piston faces the first end of the cavity, the second end of the piston faces the pyrotechnic device, and wherein the first end of the piston includes a pointed tip.

3. The window breaker of claim 2, wherein the second end of the piston cooperates with the pyrotechnic device to form a combustion chamber therebetween.

4. The window breaker of claim 1, wherein the pyrotechnic device is in electrical communication with a controller that actuates the pyrotechnic device in response to a predetermined vehicle condition.

5. The window breaker of claim 4, wherein the predetermined vehicle condition includes one or both of an impact event and an airbag deployment.

6. A system comprising:
   a window breaker including a housing and a piston, the housing having a slot and a cavity including a closed first end and a second end, the slot extending through a wall of the housing and extending into the cavity, the slot adapted to receive a portion of a vehicle window pane, the piston being disposed in the cavity between the first and second ends and movable within the cavity relative to the housing between an undeployed position and a deployed position; and
   a controller electrically connected to the window breaker and operable to cause the piston to move from the undeployed position to the deployed position in response to a predetermined condition.

7. The system of claim 6, further comprising an actuator at least partially disposed in the cavity of the housing and in electrical communication with the controller.

8. The system of claim 7, wherein the piston includes first and second ends, the first end of the piston faces the first end of the cavity, the second end of the piston faces the actuator, and wherein the first end of the piston includes a pointed tip.

9. The system of claim 8, wherein the pointed tip includes a metallic nail embedded into a body of the piston.

10. The system of claim 7, wherein the actuator includes a pyrotechnic device and an end of the piston cooperates with the pyrotechnic device to form a combustion chamber therebetween.

11. The system of claim 6, wherein the predetermined condition includes one or both of an impact event and an airbag deployment.

12. The system of claim 6, wherein the controller delays actuation of the pyrotechnic device for between about two-hundred milliseconds and about five seconds following occurrence of the predetermined vehicle condition.

13. A vehicle comprising:
a door frame;
a window pane attached to the door frame for movement relative thereto;
a window breaker attached to the door frame and including a housing, a pyrotechnic device and a piston, the housing having a slot and a cavity including a closed first end and a second end, the slot extending through a wall of the housing and extending into the cavity, the slot receiving a portion of the window pane, the pyrotechnic device being fixedly attached to the housing and at least partially disposed in the cavity, the piston being disposed in the cavity between the pyrotechnic device and the first end, the piston cooperating with the pyrotechnic device to form a combustion chamber therebetween such that a combustion event within the combustion chamber moves the piston within the cavity relative to the pyrotechnic device from an undeployed position to a deployed position; and
a controller electrically connected to the pyrotechnic device and operable to actuate the pyrotechnic device to cause the piston to move from the undeployed position to the deployed position to shatter the window frame in response to a predetermined vehicle condition.

14. The vehicle of claim 13, wherein the piston includes first and second ends, the first end of the piston faces the first end of the cavity, the second end of the piston faces the pyrotechnic device, and wherein the first end of the piston includes a pointed tip.

15. The vehicle of claim 14, wherein the pointed tip includes a metallic nail embedded into a body of the piston.

16. The vehicle of claim 13, wherein the predetermined vehicle condition includes one or both of an impact event and an airbag deployment.

17. The vehicle of claim 13, wherein the controller delays actuation of the pyrotechnic device for a predetermined time following occurrence of the predetermined vehicle condition.

18. The vehicle of claim 17, wherein the predetermined time is between about two-hundred milliseconds and about five seconds.

* * * * *